United States Patent
Yanagihashi et al.

(10) Patent No.: US 11,609,157 B2
(45) Date of Patent: Mar. 21, 2023

(54) LEARNING APPARATUS, DIAGNOSTIC APPARATUS, AND LEARNING METHOD

(71) Applicant: KABUSHIKI KAISHA TOSHIBA, Minato-ku (JP)

(72) Inventors: Hiroyuki Yanagihashi, Kawasaki (JP); Takashi Sudo, Fuchu (JP); Kazunori Imoto, Kawasaki (JP); Yasuhiro Kanishima, Suginami (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 276 days.

(21) Appl. No.: 16/807,611

(22) Filed: Mar. 3, 2020

(65) Prior Publication Data
US 2021/0010909 A1  Jan. 14, 2021

(30) Foreign Application Priority Data
Jul. 11, 2019  (JP) .............................. JP2019-129209

(51) Int. Cl.
*G01M 99/00* (2011.01)
*G10L 25/51* (2013.01)
(Continued)

(52) U.S. Cl.
CPC .......... *G01M 99/005* (2013.01); *G01H 17/00* (2013.01); *G06F 17/11* (2013.01); *G06N 3/088* (2013.01); *G10L 25/51* (2013.01)

(58) Field of Classification Search
None
See application file for complete search history.

(56) References Cited

U.S. PATENT DOCUMENTS

2019/0274108 A1*  9/2019  O'Shea ................ G06N 3/0445
2019/0294999 A1*  9/2019  Guttmann ............. G06N 5/047
(Continued)

FOREIGN PATENT DOCUMENTS

JP  2019-49778 A   3/2019
JP  2020-77186 A   5/2020
(Continued)

OTHER PUBLICATIONS

Raia Hadsell, et al., "Dimensionality Reduction by Learning an Invariant Mapping", Proceedings of the 2006 IEEE Computer Society Conference on Computer Vision and Pattern Recognition (CVPR'06), 2006, pp. 1-8.
(Continued)

*Primary Examiner* — Raul J Rios Russo
*Assistant Examiner* — Carl F. R. Tchatchouang
(74) *Attorney, Agent, or Firm* — Oblon, McClelland, Maier & Neustadt, L.L.P.

(57) ABSTRACT

According to one embodiment, a learning apparatus includes a memory and a hardware processor connected to the memory which learns a transformation function to extract a feature value of an input signal. The hardware processor updates the transformation function based on a signal indicative of a first condition and a signal indicative of a second condition which is different from the first condition, using a first loss function on the signal indicative of the first condition and a second loss function on the signal indicative of the second condition. The second loss function is designed such that the second condition becomes distant from the first condition.

14 Claims, 9 Drawing Sheets

(51) Int. Cl.
  *G01H 17/00*       (2006.01)
  *G06F 17/11*       (2006.01)
  *G06N 3/08*        (2006.01)
  *G06N 3/088*       (2023.01)

(56) References Cited

U.S. PATENT DOCUMENTS

2019/0376840 A1* 12/2019 Koizumi ............ G01N 29/4472
2020/0143605 A1*  5/2020 Kanishima ............. G06F 30/20
2021/0065918 A1   3/2021 Kanishima et al.

FOREIGN PATENT DOCUMENTS

JP       2021-33842 A      3/2021
WO   WO 2018/150616 A1     8/2018

OTHER PUBLICATIONS

@shinmura0, "What is the difference between "weak anomaly detection" and other anomaly detection?" (with English translation) downloaded from: https://qiita.com/shinmura0/items/1af83f5a5857d50cabc2, Dec. 10, 2019, 35 pages.

* cited by examiner

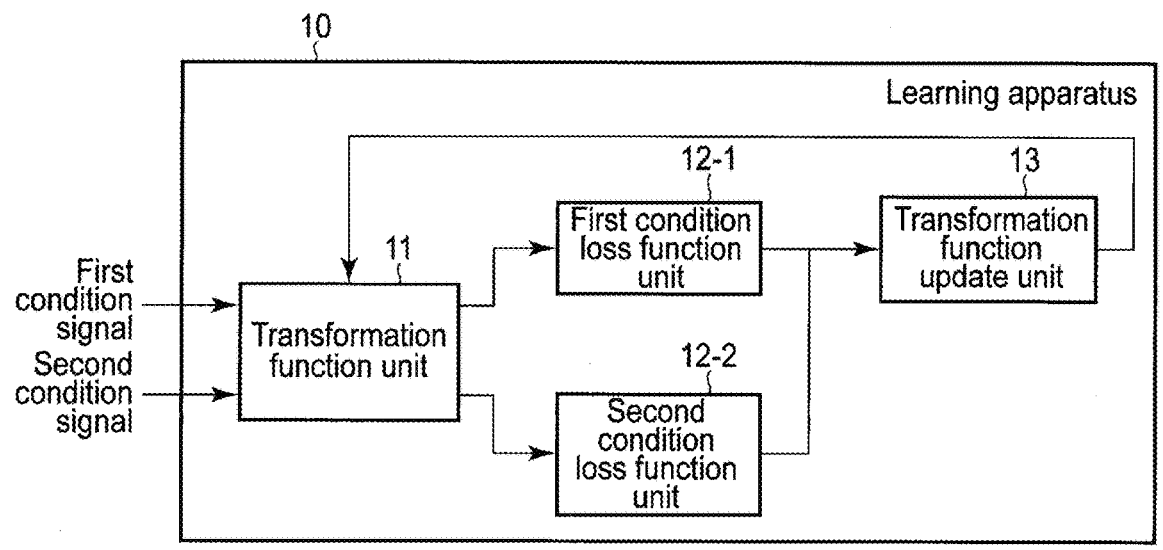
F I G. 1
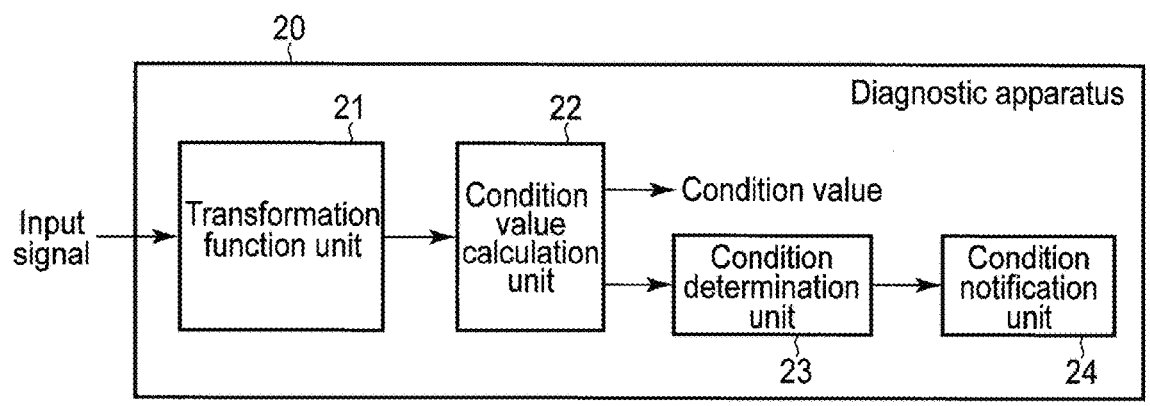
F I G. 2

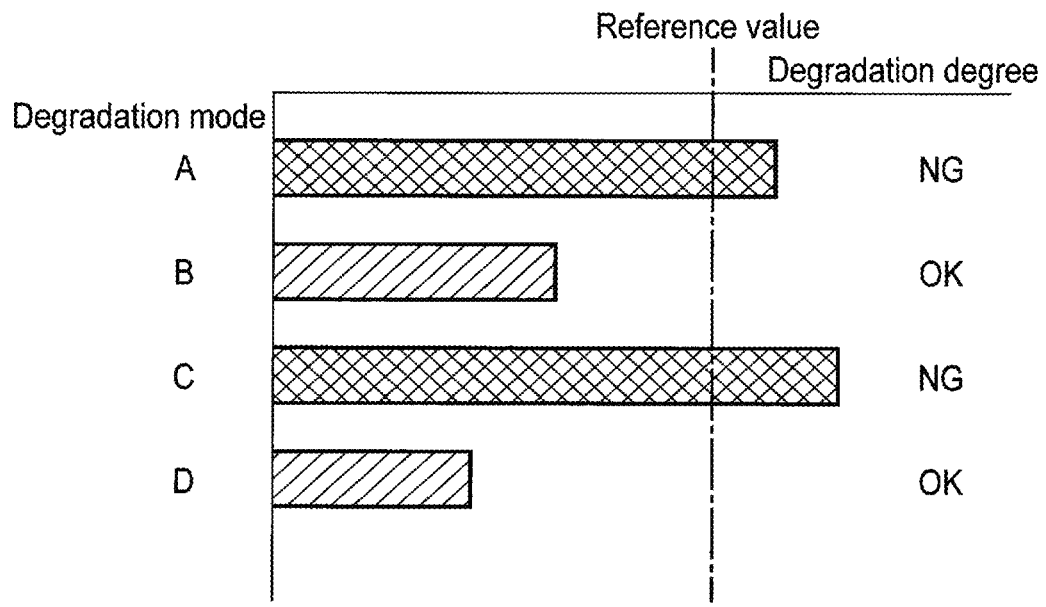
F I G. 8
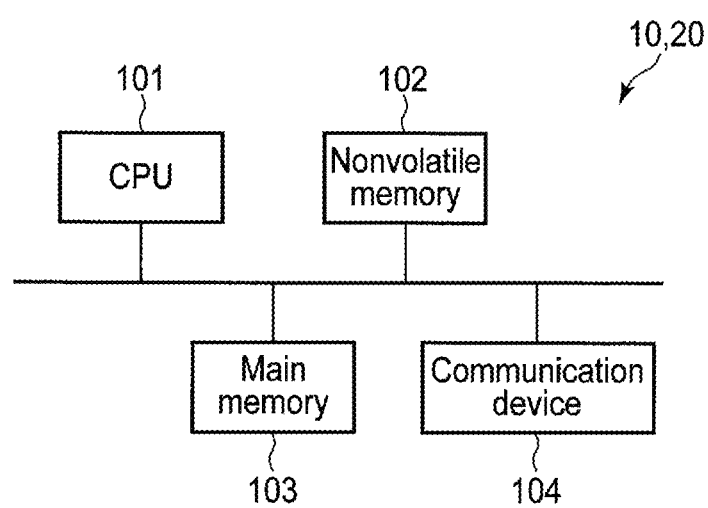
F I G. 9

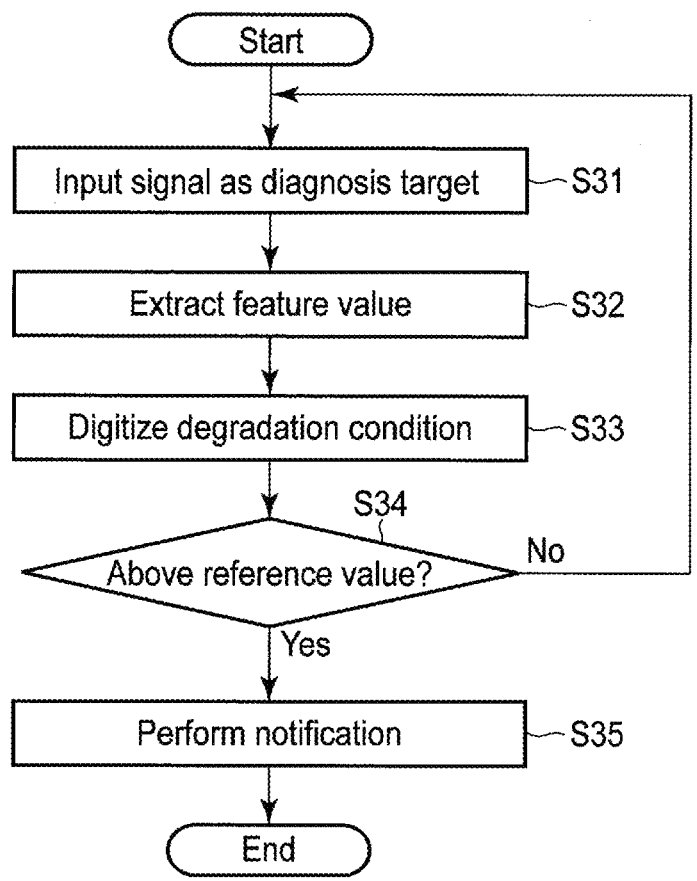
F I G. 12

US 11,609,157 B2

LEARNING APPARATUS, DIAGNOSTIC APPARATUS, AND LEARNING METHOD

CROSS-REFERENCE TO RELATED APPLICATIONS

This application is based upon and claims the benefit of priority from Japanese Patent Application No. 2019-129209, filed Jul. 11, 2019, the entire contents of which are incorporated herein by reference.

FIELD

Embodiments described herein relate generally to a learning apparatus, diagnostic apparatus, and learning method.

BACKGROUND

Industrial machines are periodically testes for safety maintenance. Abnormality of machines often is detected in sound. Thus, there is a technique to detect abnormality of machines by recording the sound of the machines in operation with a microphone and analyzing the condition of the sound.

However, an abnormality detection technique generally-known detects an occurrence of some kind of abnormality and does not detect a degradation condition (a sign of degradation) of the machines.

BRIEF DESCRIPTION OF THE DRAWINGS

FIG. 1 is a block diagram illustrating the structure of a learning apparatus of a first embodiment.

FIG. 2 is a block diagram illustrating the structure of a diagnostic apparatus of the first embodiment.

FIG. 8 is a diagram illustrating an example of a case where results of determination of each degradation mode are notified in the third embodiment.

FIG. 9 is a diagram illustrating an example of the hardware structure of the learning apparatus and the diagnostic apparatus.

FIG. 12 is a flowchart of a diagnostic process executed by a CPU of the diagnostic apparatus.

DETAILED DESCRIPTION

Figure 3:
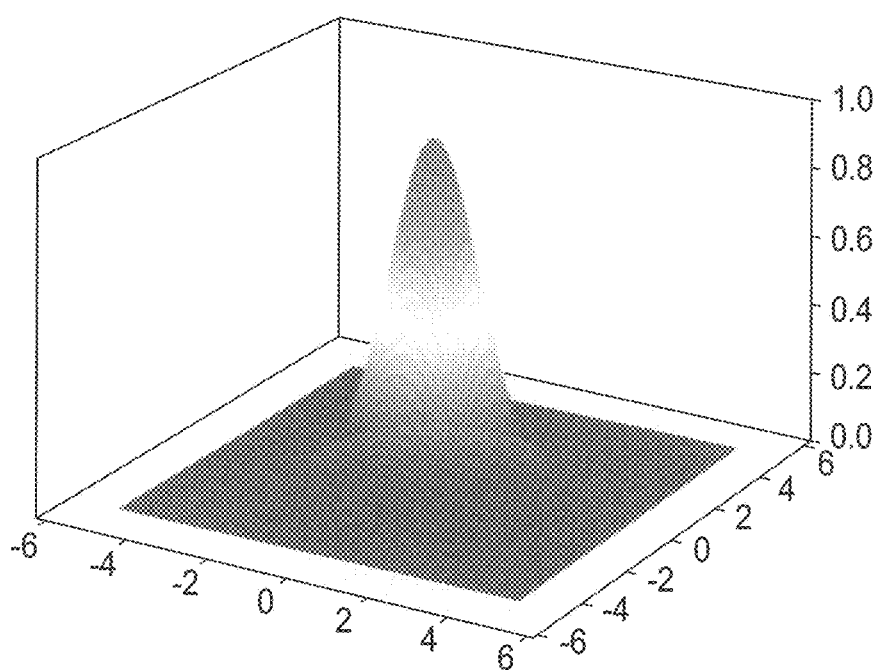
FIG. 3 is a diagram of an example of a regularized multidimensional Gaussian distribution (two dimension).

In general, according to one embodiment, a learning apparatus includes a memory and a hardware processor connected to the memory which learns a transformation function to extract a feature value of an input signal. The hardware processor updates the transformation function based on a signal indicative of a first condition and a signal indicative of a second condition which is different from the first condition, using a first loss function on the signal indicative of the first condition and a second loss function on the signal indicative of the second condition. The second loss function is designed such that the second condition becomes distant from the first condition.

Hereinafter, embodiments will be explained with reference to accompanying drawings. Note that, the disclosure is an example, and the contents of the following description do not limit the scope of the invention. Variations which will easily be conceivable by a person having ordinary skill in the art are naturally encompassed within the scope of the invention. In the figures, dimensions of components may be depicted schematically as compared to actual models of the invention for easier understanding. Elements corresponding to each other between different figures will be referred to by the same reference number, and explanation considered redundant may be omitted.

First Embodiment

In the present embodiment, for example, a degradation condition (sign of degradation) of an industrial machine is detected based on a signal of sound. A microphone to pick up sound of the machine is not required to be directly disposed on the machine, and the signal of sound can be picked up without contact. A signal of sound of the machine in a normal condition is different from a signal of sound of the machine in a degradation condition.

The present embodiment aims to early detect a degradation condition by analyzing a difference between the signal of sound of the machine in the normal condition and the signal of sound of the machine in the abnormal condition with high accuracy. Note that a term degradation means that the normal condition is changed to a certain degree and a failure of the machine is expected. A term failure means that the machine cannot perform its purpose.

Now, for easier understanding of the present embodiment, a feature vector transformation function and a loss function used in the learning apparatus of the present embodiment will be explained.

A feature vector transformation function is a function to extract a feature value from an input signal. As the feature vector transformation function, for example, a neural network such as Variational Autoencoder (VAE) is used. The VAE includes an encoder which converts an input to a latent variable and a decoder which restructures the input from the latent variable. The encoder functions as a function to convert an input into a feature vector.

Normally, the encoder of the VAE does not directly output a latent variable but outputs an average vector $\mu$ and a covariance vector $\sigma^2$ of isotropic Gaussian distribution to which the latent variable conforms. When the VAE is used in abnormality detection or degradation-degree estimation, a restructure probability or its negative log-likelihood will be used as an abnormal degree/degradation degree. If the latent variable space model of normal data is a Gaussian distribution defined by an average vector $\mu_n$ and a variance-covariance matrix $\Sigma_n$, the negative log-likelihood of the reconstruction probability of the average vector $\mu_z$ output by the encoder as the abnormal degree/degradation degree will be represented by the following formula (1).

$$A_{VAE} = -\log p(\mu_z | \mu_n, \Sigma_n) \quad (1)$$

If the VAE is learnt with an ordinary loss function, the learning is performed such that the latent variable represents a natural feature value (feature vector) of the learning data. Thus, there may not be a difference between a latent variable with respect to the normal data and a latent variable with respect to degradation data which are slightly changed from the normal data. That is, an ordinary loss function does not properly respond to a slight change, and thus, a loss function must be tuned such that the latent variable can properly change from the normal data.

Now, where the loss function in the normal condition (first condition) is given Loss1, the following formula (2) is established. A loss function of VAE is used for loss function Loss1.

$$Loss1 = (\text{restructure difference}) + C * (\text{regularization term}) = \frac{1}{D}\sum_{i=1}^{D}\|x_i - x'_i\|^2 + C*(-D_{KL}(N(\mu_z, \sigma_z^2) \mid N(0, I))) \quad (2)$$

Note that X represents an input, X' represents reconstruction of VAE, and D represents a dimensionality of input. Furthermore, $D_{KL}$ represents Kullback-Leibler divergence (KL divergence), and C is a constant to adjust a size of regularization term.

The first term of above formula (2) is a restructure difference as an Autoencoder (AE). KL divergence in the second term is a regularization term which renders the latent variable closer to center 0. A phrase of rendering the latent variable closer to center 0 means that the latent variable becomes closer to an ideal distribution.

Here, the following formula (3) is designed where a loss function in a degradation condition (second condition) is given Loss2.

$$Loss2 = \\ (\text{restructure difference}) + C' * (\text{term to render the latent variable distant from the center}) = \\ \frac{1}{D}\sum_{i=2}^{D}\|x_i - x'_i\|^2 + C' * \frac{d(\mu_z)}{1 - d(\mu_z) + \varepsilon} \quad (3)$$

Note that C' is a constant to adjust a size of a term to render the latent variable distant from the center, and d(x) is represented as a multidimensional Gaussian distribution probability density regularized to a maximum value 1 (formula (4)).

$$d(x) = \frac{N(x; 0, I)}{N(0; 0, I)} \quad (4)$$

FIG. 3 illustrates an example of a regularized multidimensional Gaussian distribution (two dimensional). N is a multidimensional Gaussian distribution probability density defined by an average vector $\mu$ and a variance-covariance matrix $\Sigma$: (x; $\mu$, $\Sigma$).

Figure 4:
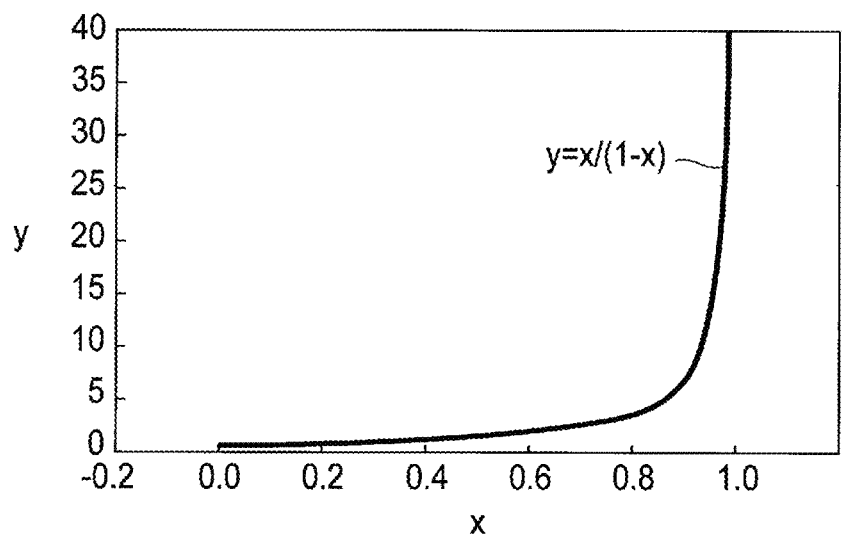
FIG. 4 is a diagram illustrating an example of a loss function plotted by $y=x/(1-x)$.

The first term of formula (3) is a restructure difference as in the normal condition. The second term is different from the normal condition, and renders the latent variable distant from center 0. That is, $d(\mu_z)$ of the second term becomes greater as closing to 1, and is updated to decrease a loss, and thus, becomes distant from center 0. FIG. 4 illustrates an example of a loss function plotted y=x/(1−x). It is understood that when a value of input x corresponding to above $d(\mu_z)$ becomes closer to 1, output y becomes greater.

Loss function Loss2 as above is applied to data of degradation condition (second condition) and loss function Loss1 is applied to data of normal condition to learn the feature vector transformation function. Thus, a change occurs in the latent variable of the feature vector transformation function in degradation data which only slightly change from normal data. Therefore, a condition of a machine can be monitored as to, instead of a simple occurrence of abnormality, a degradation degree with high accuracy.

Note that the degradation data may not be acquired as live data. For example, if a machine is known to be worn, data of a degradation condition may be simulated and used as the degradation data. Or, as the degradation data, live data acquired from a machine which is not determined to be worn but is used for a certain period of time and possibly has a condition change may be used.

Hereinafter, a learning apparatus to learn the feature vector transformation function and a diagnostic apparatus implementing the feature vector transformation function learnt by the learning apparatus will be explained.

FIG. 1 is a block diagram illustrating the structure of the learning apparatus of the first embodiment.

A learning apparatus 10 is, for example, a PC or a server computer, and has a learning function of the feature vector transformation function.

As in FIG. 1, the learning apparatus 10 includes a transformation function unit 11, first condition loss function unit 12-1, second condition loss function unit 12-2, and transformation function update unit 13.

In the learning process, the transformation function unit 11 receives a signal indicative of a first condition (first condition signal) and a signal indicative of a second condition (second condition signal) as input targets. The transformation function unit 11 extracts a feature value from the signals using the feature vector transformation function. In that case, if a signal is of sound, the signal is subjected to a frequency transformation (Fourier transformation) and a feature value of the sound is extracted.

Here, the first condition signal is a signal acquired when a machine is in a normal condition. The second condition signal is a signal acquired when a machine of the same type is in a degradation condition. That is, the first condition signal is picked up from a newly produced machine, for example. The second condition signal is a signal picked up from a machine in a degradation condition, or is generated in a simulation after several experiments, for example.

The learning apparatus 10 determines whether the input signal is the first condition signal or the second condition signal through the following methods.

A label indicative of a signal type is applied to each of the first condition signal and the second condition signal preliminarily. The learning apparatus 10 determines whether the input signal is the first condition signal or the second condition signal based on the label of the input signal.

An input order of signals is preliminarily set such that the second condition signal is input after inputting the first condition signal. The learning apparatus 10 determines whether or not the input signal is the first condition signal or the second condition signal in accordance with the input order of the signals.

A waveform of the signal indicative of the first condition (normal condition) is preliminarily stored in the learning apparatus 10. The learning apparatus 10 determines that the input signal is the first condition signal if the waveform of the input signal is close to the first condition preliminarily stored, and determines that the input signal is the second condition signal if the waveform of the input signal is different from the first condition.

The first condition loss function unit 12-1 recognizes that a feature value (feature vector) of the first condition signal (normal condition signal) as an input value, and calculates a difference between the input value and an output value using loss function Loss1 of above formula (2). On the other hand, the second condition loss function unit 12-2 recognizes that a feature value (feature vector) of the second condition signal (degradation condition signal) as an input value, and calculates a difference between the input value and an output value using loss function Loss2 of above formula (3).

As described above, loss function Loss1 has a regularization term and is designed to render the input value closer to an ideal value. On the other hand, loss function Loss2 has a term to be distant from center 0 and is designed to render the second condition distant from the first condition.

The transformation function update unit 13 updates a variable of the feature vector transformation function related to the first and second condition signals based on a difference calculated by the first condition loss function unit 12-1 and a difference calculated by the second condition loss function unit 12-2. In that case, the transformation function update unit 13 updates a variable of the feature vector transformation function such that the first condition signal becomes closer to an ideal value, and updates a variable of the feature vector transformation function such that the second condition signal becomes distant from the ideal value.

As above, a variable of the feature vector transformation function is updated repeatedly such that the second condition becomes distant from the first condition using the signal indicative of the first condition and the signal indicative of the second condition different from the first condition. Thus, the feature vector transformation function which can suitably respond to a slight change from the first condition can be achieved, and a degradation condition of the device can be detected early using the feature vector transformation function. In contrast, in a method of learning a feature vector transformation function using only normal data, there is no response to degradation data which are slightly changed from normal data, and thus, it is difficult to detect a degradation condition of a device in an early stage.

FIG. 2 is a block diagram illustrating the structure of a diagnostic apparatus of the first embodiment.

The diagnostic apparatus 20 is, for example, a PC or a server computer as with the learning apparatus 10. The feature vector transformation function optimized by the learning apparatus (that is, transformation function after the learning) is installed in the diagnostic apparatus 20. The diagnostic apparatus 20. diagnoses a condition of a device based on an input signal.

As in FIG. 2, the diagnostic apparatus 20 includes a transformation function unit 21, condition value calculation unit 22, condition determination unit 23, and condition notification unit 24.

The transformation function unit 21 corresponds to the transformation function unit 11 of FIG. 1. The transformation function unit 21 has a feature vector transformation function optimized by the learning apparatus 10. The transformation function unit 21 receives a signal indicative of a condition of a machine which is a diagnostic target, and extracts a feature value of the signal (feature vector) using the feature vector transformation function. The signal indicative of a condition of a device includes a signal of sound picked up by a microphone, for example. If the signal is a signal of sound, the signal is subjected to a frequency transformation (Fourier transformation), and then, a feature value of the sound is extracted.

The condition value calculation unit 22 digitizes a condition of the machine based on the feature value (feature vector) extracted by the transformation function unit 21. Digitizing a condition of the machine means calculating a degradation degree of the machine, specifically. The value calculated by the condition value calculation unit 22 (value indicative of a condition of machine) is output to an external device and is given to the condition determination unit 23. The external device includes, for example, a monito or a server which is not shown.

The condition determination unit 23 determines a condition of a machine based on a value calculated by the condition value calculation unit 22. Specifically, the condition determination unit 23 determines a condition of a machine into three stages such as normal, slightly worn, and worn, for example.

The condition notification unit 24 performs notification corresponding to a determination result of the condition determination unit 23. In that case, the notification may be performed in a case where the condition of machine is worn, or may be performed each of slightly worn and worn stages. Notification may be performed, for example, sound through a buzzer or light through a lamp, or a communication function may be applied to the diagnostic apparatus 20 to notify the condition to an operator in a monitoring room.

As above, the feature vector transformation function optimized by the learning apparatus 10 is used in the diagnostic apparatus 20, and thus, for example, in the determination of a degradation condition of a device from a signal of sound, a fine change in sound can be recognized accurately and a degradation degree of a current machine can be digitized and output.

Furthermore, since the feature vector transformation function is learnt using the signal of sound of the machine in a normal condition and the signal of sound of the machine in a degradation condition, a degradation degree of a current machine can be determined accurately without being affected by temporal noise. In that case, in determination of occurrence of abnormality by an Autoencoder which only learns a normal condition, it is affected by noise and abnormality may be erroneously determined.

Furthermore, in general, replacement of a machine is preliminarily scheduled, and at the time of replacement, is replaced with a newly-produced machine. In contrast, with the learning apparatus 10 of the present embodiment, a degradation degree of a current machine can be recognized accurately, and if the degradation degree is above a preset standard value, replacement of the machine before the scheduled replacement can be performed in an early stage, for example. Or, if the degradation degree is below a preset standard value, the current machine can be used after the scheduled replacement, and the life of the machine can be elongated.

Second Embodiment

Now, a second embodiment will be explained.

In the second embodiment, a feature vector transformation function is learnt using a plurality of degradation patterns. That is, after a feature vector transformation function is once learnt, if a new degradation pattern is recognized or a new degradation data are obtained, additional learning may be performed with respect to the degradation data. In that case, a loss function used may be a second loss function (loss function Loss2) used beforehand. Or, a third loss function having a feature steeper than the second loss function may be used to be distinguished from the second loss function.

Figure 5:
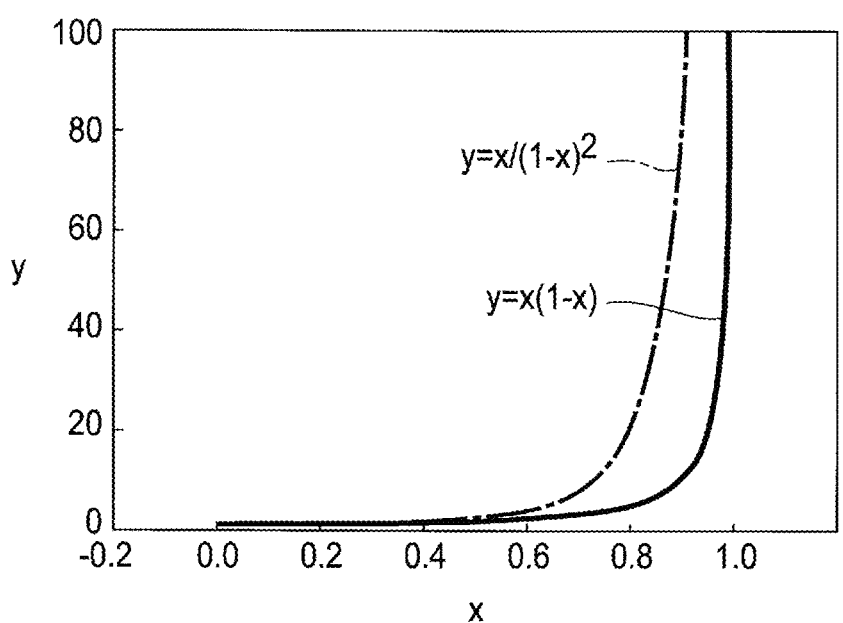
FIG. 5 is a diagram illustrating an example of a loss function plotted by $y=x/(1-x)$ and $y=x/(1-x)^2$.

FIG. 5 illustrates an example of a loss function plotted by $y=x/(1-x)$ and $y=x/(1-x)^2$. The one represented by $y=x/(1-x)^2$ is steeper. Here, the steep loss function is, for example, one represented as exponentiation of a denominator of a second term of a second loss function as a relationship between the following formulae (5) and (6).

$$\frac{d(\mu_z)}{1-d(\mu_z)+\varepsilon} \quad (5)$$

$$\frac{d(\mu_z)}{(1-d(\mu_z))^2+\varepsilon} \quad (6)$$

Hereinafter, the specific structure of the learning apparatus using a plurality of degradation patterns.

Figure 6:
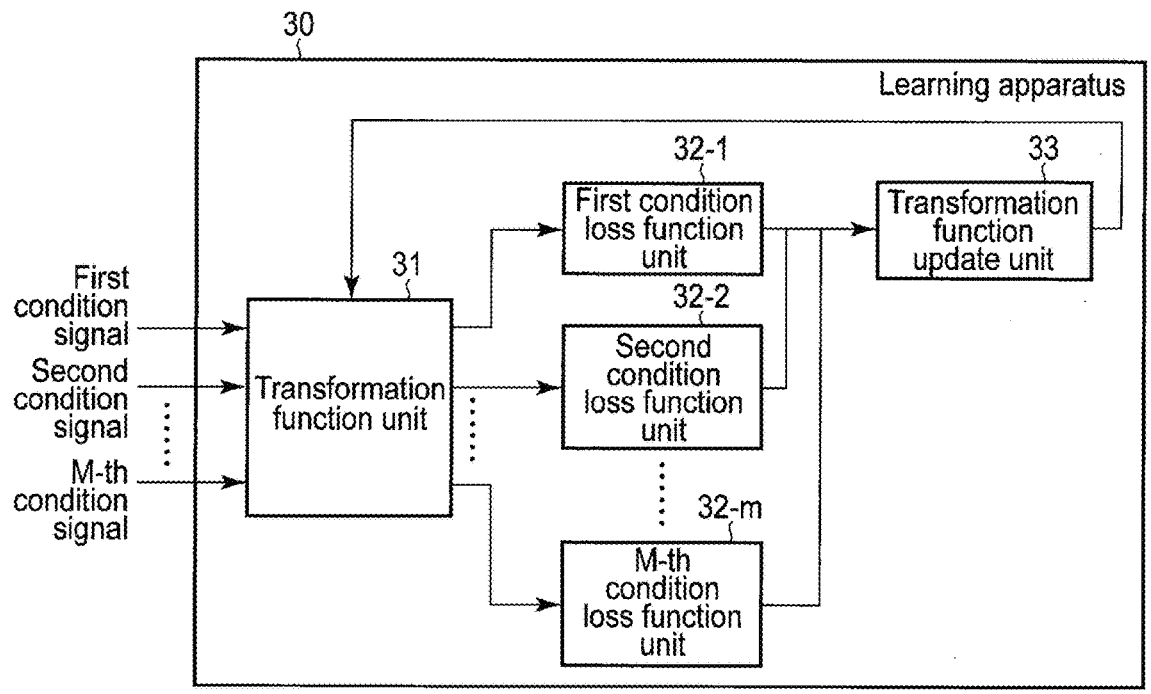
FIG. 6 is a block diagram illustrating the structure of a learning apparatus of a second embodiment.

FIG. 6 is a block diagram illustrating the structure of the learning apparatus of the second embodiment.

In the second embodiment, a learning apparatus 30 includes a transformation function unit 31, first condition loss function unit 32-1, second to m-th condition loss function unit 32-2 to 32-m (m is an integer of three or more), and transformation function update unit 33.

The transformation function unit 31 corresponds to the transformation function unit 11 of FIG. 1 and has a feature vector transformation function. In the second embodiment, the transformation function unit 31 receives a signal indicative of a first condition and a signal indicative of each of second to m-th signals, and extracts a feature value of the signals using the feature vector transformation function. If the signals are of sound, the signals are subjected to a frequency transformation (Fourier transformation), and then, a feature value of the sound is extracted.

Here, the first condition signal is a signal acquired when a machine is in a normal condition. The second to m-th condition signals correspond to degradation patterns acquired from a machine of the same type. That is, the first condition signal is picked up from a newly produced machine, for example. The second to m-th condition signals are picked up from machines of the same type in a degradation condition, or are generated in a simulation after several experiments with different degradation patterns, for example.

The first condition loss function unit 32-1 corresponds to the first condition loss function unit 12-1 of FIG. 1. The first condition loss function unit 32-1 recognizes that a feature value (feature vector) of the first condition signal (normal condition signal) as an input value, and calculates a difference between the input value and an output value using loss function Loss1 of above formula (2).

On the other hand, the second condition loss function unit 32-2 recognizes that a feature value (feature vector) of the second condition signal (degradation condition signal) as an input value, and calculates a difference between the input value and an output value using loss function Loss2 of above formula (3).

Here, the learning apparatus 30 includes at least one m-th condition loss function unit 32-m which is different from the second condition loss function unit 32-2. The m-th condition loss function unit 32-m recognizes that a feature value (feature vector) of the m-th condition signal (signal indicative of a degradation condition which is different from that of the second condition) extracted by the transformation function unit 31 as an input value, and calculates a difference between the input value and an output value using a loss function which is the same as or different from loss function Loss2 of above formula (3). As explained above with reference to FIG. 5, the loss function has a steeper feature than loss function Loss 2 of above formula (3).

The transformation function update unit 33 corresponds to the transformation function update unit 13 of FIG. 1. The transformation function update unit 33 updates a variable of the feature vector transformation function based on a difference calculated by the first condition loss function unit 32-1, and a difference calculated by each of the second to m-th condition loss function units 32-2 to 32-m. In that case, the transformation function update unit 33 updates a variable of the feature vector transformation function such that the first condition signal becomes closer to an ideal value, and updates a variable of the feature vector transformation function such that each of the second to m-th condition signals becomes distant from the ideal value.

Through updating a variable of the feature vector transformation function using different degradation patterns, the feature vector transformation function can be further optimized than a case where the update is performed using one degradation pattern.

For example, when fans of some machines are worn, features of sound of the fans of the machines may slightly differ. Thus, differences in the sound are gathered as many as possible and reflected upon the learning as degradation patterns to determine a degradation degree of a machine from an input signal of sound with more accuracy in a scene where the learnt feature vector transformation function is actually used. Note that the structure of a diagnostic apparatus in which the learnt feature vector transformation function is implemented is similar to that of the diagnostic apparatus 20 of FIG. 2, and thus, the detailed description thereof will be omitted.

Third Embodiment

Now, a third embodiment will be explained.

In the third embodiment, a feature vector transformation function is learnt for each of different degradation modes. In a machine in a degradation condition, various parts of the machine are worn, and a feature of sound is different in the parts. For example, if a machine has a first fan and a second fan, sound made by the first fan worn and sound made by the second fan worn are slightly different, and if there is another worn part, different sound is made. In the third embodiment, degradation modes corresponding to such parts of the machine are set, and a degradation degree is determined per degradation mode.

Figure 7:
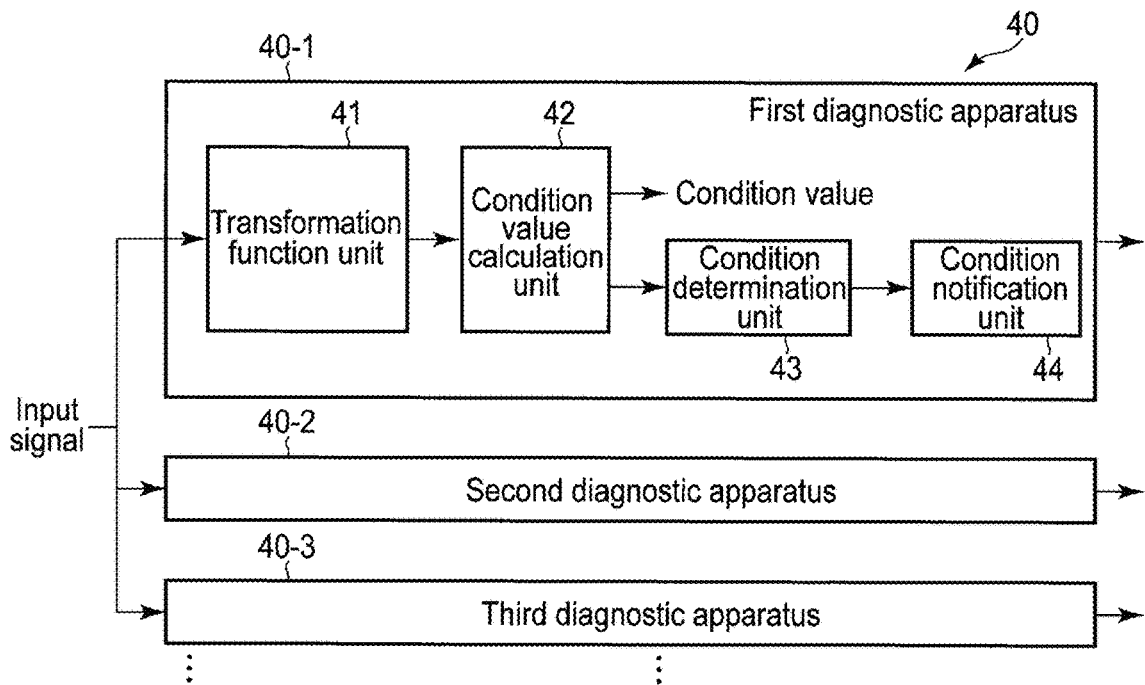
FIG. 7 is a block diagram illustrating the structure of a diagnostic system of a third embodiment.

FIG. 7 is a block diagram illustrating the structure of a diagnostic system of the third embodiment. An diagnostic system 40 includes a plurality of diagnostic apparatuses 40-1, 40-2, 40-3, . . . .

The diagnostic apparatuses 40-1, 40-2, 40-3, . . . are, for example, PCs or server computers. The diagnostic apparatuses 40-1, 40-2, 40-3, . . . have a feature vector transformation function learnt for different degradation modes A, B, C, . . . . Note that the learning of the feature vector transformation function is performed through the methods explained in the first or second embodiment. The diagnostic apparatuses 40-1, 40-2, 40-3, . . . may be connected through the communication network, or may be incorporated in one device.

The diagnostic apparatus 40-1 includes a transformation function unit 41, condition value calculation unit 42, condition determination unit 43, and condition notification unit 44. Note that the structure of the diagnostic apparatus 40-1 is similar to the diagnostic apparatus 20 of FIG. 2, and thus, the detailed description thereof will be omitted. The same applies to other diagnostic apparatuses 40-2, 40-3, . . . .

In such a structure, a signal indicative of a condition of a machine to be a diagnostic target is input to the diagnostic apparatuses 40-1, 40-2, 40-3, . . . . The signal indicative of a condition of a machine includes a signal of sound picked up by a microphone, for example. Here, the diagnostic apparatus 40-1 has an optimized feature vector transformation function corresponding to a degradation mode A, and determines a degradation degree based on a feature value (feature vector) of the signal extracted using the feature vector transformation function.

Specifically, in the diagnostic apparatus 40-1, the transformation function unit 41 extracts a feature value (feature vector) of an input signal using the optimized feature vector transformation function corresponding to the degradation mode A. The optimized feature vector transformation function corresponding to the degradation mode A is a feature vector transformation function preliminarily learnt to correspond to a feature of signal (sound) from a worn part corresponding to the degradation mode A. The condition value calculation unit 42 digitizes a condition of a machine in the degradation mode A based on the feature value extracted by the transformation function unit 41.

Similarly, the diagnostic apparatus 40-2 has an optimized feature vector transformation function corresponding to a degradation mode B, and determines a degradation degree based on a feature value (feature vector) of the signal extracted using the feature vector transformation function. The diagnostic apparatus 40-3 has an optimized feature vector transformation function corresponding to a degradation mode C, and determines a degradation degree based on a feature value (feature vector) of the signal extracted using the feature vector transformation function. Thus, a result of determination (value of a degradation degree) can be obtained per degradation mode through the diagnostic apparatuses 40-1, 40-2, 40-3, . . . , and is notified through a certain method.

As a notification method, a result of determination may be displayed on a monitor (which is not shown), or a buzzer, a lamp, or the like may be used in the diagnostic apparatuses 40-1, 40-2, 40-3, . . . , and a result of determination may be notified to an operator in a monitoring room through a communication function applied to the diagnostic apparatuses 40-1, 40-2, 40-3, . . . .

FIG. 8 illustrates an example where results of determination of degradation modes are notified. In this example, results of determination (values of degradation degree) corresponding to four degradation modes A to D are displayed on a monitor (which is not shown) in a monitoring room. Wear modes A to D correspond to each part of a machine, for example. Here, if a reference value of a degradation degree which triggers replacement is set on the monitor, what part requires replacement can be directly grasped visibly.

Note that, in the example of FIG. 7, the diagnostic process is performed separately per degradation mode using the diagnostic apparatuses 40-1, 40-2, 40-3, . . . , or the diagnostic process may be performed per degradation mode with one diagnostic apparatus.

As above, if a feature vector transformation function is learnt for each of different degradation modes, degradation conditions corresponding to the degradation modes can be determined finely. Thus, a part which is particularly worn in a machine can be specified, and a suitable response such as parts replacement can be performed.

(Hardware Structure)

FIG. 9 is a diagram illustrating an example of the hardware structure of the learning apparatus 10 and the diagnostic apparatus 20 of the first embodiment.

The learning apparatus 10 includes, as components of the hardware, a CPU 101, nonvolatile memory 102, main memory 103, and communication device 104, for example.

The CPU 101 is a hardware processor configured to control an operation of various components in the learning apparatus 10. The CPU 101 executes various programs loaded from the nonvolatile memory 102 which is a storage device to the main memory 103.

The program executed by the CPU 101 includes, for example, an operating system (OS) and a program to execute an operation of the process indicated in flowcharts of FIG. 10 or 11 (hereinafter referred to as learning program). Furthermore, the CPU 101 executes a basic input/output system (BIOS) which is a program for the hardware control, for example.

Note that all of or part of the transformation function unit 11, condition loss function units 12-1 and 12-2, transformation function update unit 13 of FIG. 1 are realized by ordering the CPU 101 which is a computer to execute the above-mentioned learning program. The learning program may be stored in a computer-readable recording medium to be distributed, or may be downloaded in the learning apparatus 10 through the network. Note that all of or part of the transformation function unit 11, condition loss function units 12-1 and 12-2, transformation function update unit 13 may be realized as a hardware such as integrated circuit (IC) or the like, or may be realized as a combination of such software and hardware.

The communication device 104 is a device configured to execute communication with an external device in a wired or wireless manner.

The same applies to the hardware structure of the diagnostic apparatus 20. The diagnostic apparatus 20 has a program to execute an operation of the process of the flowchart of FIG. 12 (hereinafter referred to as diagnostic program). The diagnostic program may be stored in a computer-readable recording medium to be distributed, or may be downloaded in the diagnostic apparatus 200 through the network. Note that all of or part of the transformation function unit 21, condition value calculation unit 22, condition determination unit 23, and condition notification unit 24 of FIG. 2 are realized by ordering the CPU 101 which is a computer to execute the above-mentioned diagnostic program.

The learning apparatus 30, diagnostic apparatuses 40-1, 40-2, 40-3, . . . of the other embodiments have the same hardware structure, and when the CPU 101 which is a computer reads a certain program, a process corresponding to each machine and device can be performed.

Hereinafter, a learning process and a diagnostic process executed by the CPU 101 will be explained with reference to the learning apparatus 10 and the diagnostic apparatus 20 of the first embodiment.

(Learning Process)

Figure 10:
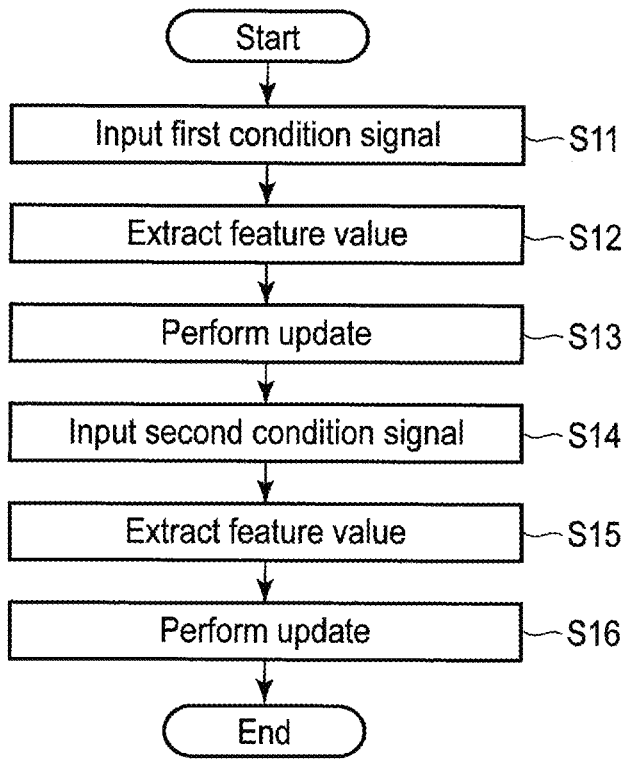
FIG. 10 is a flowchart of a learning process executed by a CPU of the learning apparatus.

FIG. 10 is a flowchart of the operation of the learning process executed by the CPU 101 of the learning apparatus 10. The process of the flowchart is executed by the CPU 101 which is a hardware processor reading a learning program recorded on the nonvolatile memory 102 or the like.

Initially, the CPU 101 inputs a first condition signal (step S11). The first condition signal is a signal of sound obtained when a machine is in a normal state, for example. The CPU 101 extracts a feature value from the first condition signal using a preset feature vector transformation function (step S12). When the feature value of the first condition signal is obtained, the CPU 101 update a variable of the feature vector transformation function of the first condition signal using loss function Loss1 of formula (2) (step S13).

Then, the CPU 101 inputs a second condition signal (step S14). As described above, the second condition signal is a signal of sound obtained when a machine is in a degradation condition. The CPU 101 extracts a feature value from the second condition signal using the feature vector transformation function (step S15). When the feature value of the second condition signal is obtained, the CPU 101 updates a variable of the feature vector transformation function of the second condition signal using loss function Loss2 of formula (3) (step S16).

Note that, in the example of FIG. 10, an update of the feature vector transformation function of the first condition signal and an update of the feature vector transformation function of the second condition signal are executed separately, and the two updates may be performed at the same time.

Figure 11:
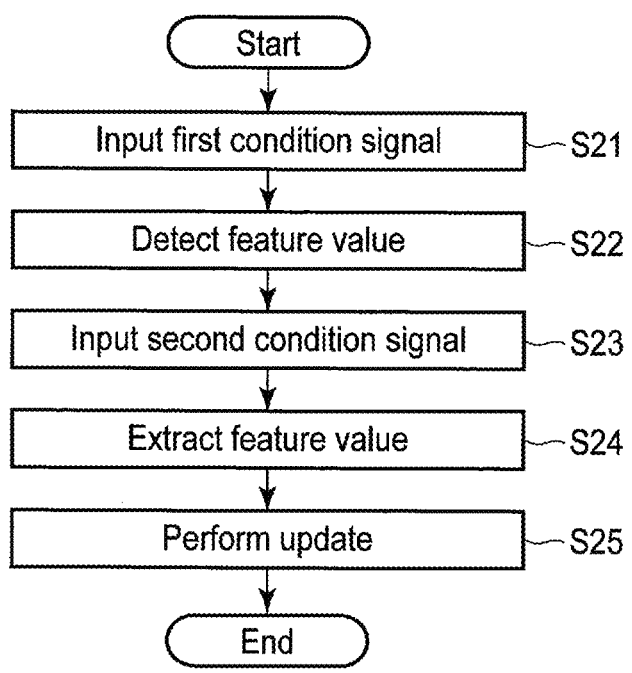
FIG. 11 is a flowchart of an update process where two updates are performed at the same time by the CPU of the learning apparatus.

FIG. 11 is a flowchart of an operation where two updates are performed at the same time. The process of the flowchart is executed by the CPU 101 which is a hardware processor reading the learning program.

Firstly, CPU 101 inputs a first condition signal (step S21), and extracts a feature value from the first condition signal using a preset feature vector transformation function (step S22). Then, the CPU 101 inputs a second condition signal (step S23) and extracts a feature value from the second condition signal using the feature vector transformation function (step S24).

When a feature value of each of the first condition signal and the second condition signal are obtained as above, the CPU 101 updates a variable of the feature vector transformation function of the first condition signal and the second condition signal using loss function Loss1 of formula (2) above and loss function Loss2 of formula (3) above (step S16).

(Diagnostic Process)

FIG. 12 is a flowchart of an operation of a diagnostic process executed by the CPU 101 of the diagnostic apparatus 20. The process of the flowchart is executed by the CPU 101 which is a hardware processor reading a diagnostic program recorded in the nonvolatile memory 102.

Firstly, the CPU 101 receives an input signal indicative of a condition of a machine which is a target of diagnostic (step S31). The signal indicative of a condition of a machine is a signal of sound picked up by a microphone, for example. The CPU 101 extracts a feature value (feature vector) of the input signal using the feature vector transformation function after the learning (step S32).

When the feature value of the input signal is obtained, the CPU 101 digitizes a condition of a machine based on the extracted feature value (step S33). Digitizing a condition of a machine means calculating a degradation degree of a machine, specifically. Here, if the degradation degree of the device is above a preset reference value (YES in step S34), the CPU 101 notifies that the degradation of the machine is in progress (step S35). Specifically, the CPU 101 turns on a lamp which drives a buzzer disposed in the diagnostic apparatus 20. Furthermore, the CPU 101 notifies that the degradation of the machine is in progress by communicating with a monitoring device in a monitoring room, for example.

Note that, the notification is performed if a degradation degree of a machine is above a reference value in this example, but the degradation degree of the device may be constantly displayed on a monitor instead.

(Application Example)

Now, a monitoring system to monitor plurality devices will be explained as an application example of the embodiment.

For example, a case where a sign of degradation of cooling fan disposed in an uninterruptable power supply (UPS) is monitored will be considered. A cooling fan discharges heat inside the UPS, and if the cooling fan stops, the UPS itself stops accordingly. Thus, for a maintenance reason, detection of a sign of degradation of the cooling fan, and replacement of the cooling fan before malfunction are required.

A microphone is disposed beside the cooling fan, and operation sound of the cooling fan is picked up to monitor a sign of degradation. At that time, as a type of the monitoring system, monitoring of a degradation degree by software in an edge device disposed in the proximity of a monitoring target device, or data or the microphone may be transferred to a server and monitored by software on the server.

Notification may be performed when a degradation condition of the monitoring target device is detected by the software on the edge device using a monitor, LED, or buzzer on the edge device, or may be notified to a monitoring room through communication. Similarly, when a degradation condition of the monitoring target device is detected by software on the server, notification is performed through a suitable manner.

Hereinafter, a case where a degradation condition of the monitoring target device is monitored by software on the server will be considered.

Figure 13:
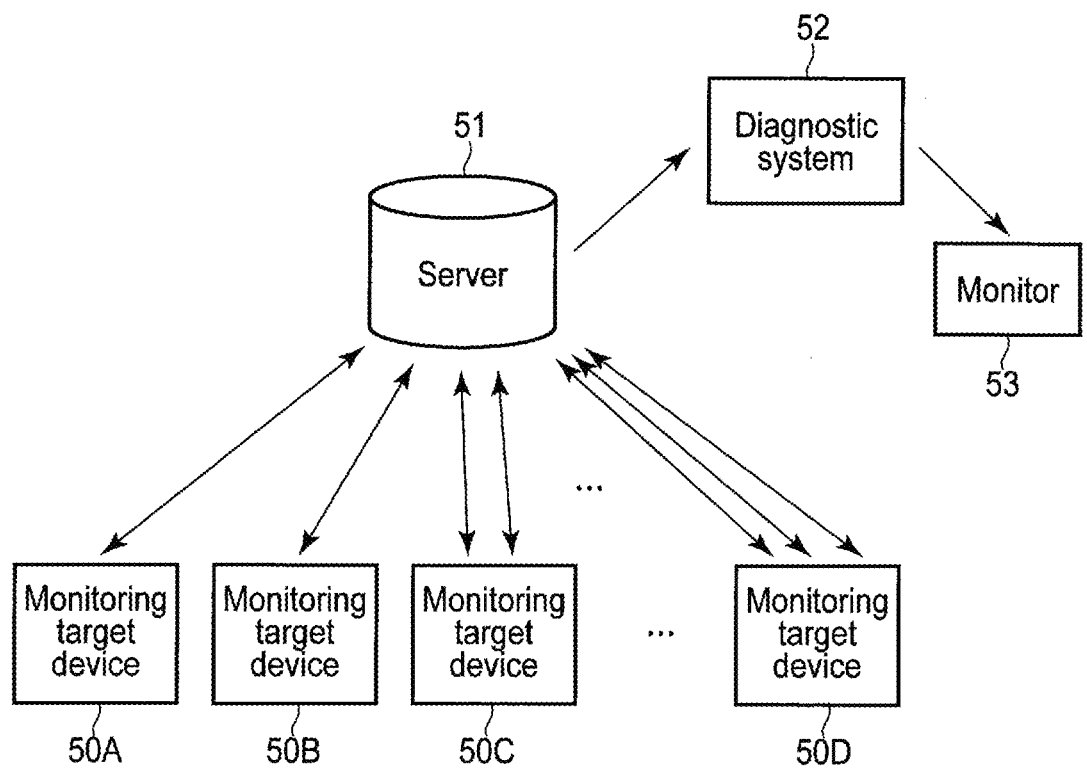
FIG. 13 is a diagram illustrating the structure of a monitoring system as an application example of the embodiment.

FIG. 13 illustrates the structure of the monitoring system. The monitoring system includes a diagnostic apparatus 20 explained in the first embodiment. Hereinafter, a case where the diagnostic apparatus 20 is the server 51 will be explained.

The server 51 monitors one or more of monitoring target devices 50A, 50B, 50C, and 50D, and detects abnormality or failure of the monitoring target devices 50A, 50B, 50C, and 50D in cooperation with the diagnostic system 52. The server 51 may monitor one monitoring target device, or may monitor several monitoring target devices in parallel. Note that the diagnostic system 52 may be disposed in the server 51 or may be disposed in a computer which is different from the server 51.

The monitoring target devices 50A, 50B, 50C, and 50D are, for example, uninterruptible power supply devices. The server 51 and the monitoring target devices 50A, 50B, 50C, and 50D can exchange data there between through a wired or wireless manner. The monitoring target devices 50A, 50B, 50C, and 50D transfers a signal of sound picked up by microphones 57A and 57B (cf. FIG. 14) provided with each of the casing of the monitoring target devices 50A, 50B, 50C, and 50D. The server 51 stores a signal of sound received from the monitoring target devices 50A, 50B, 50C, and 50D in a storage device or the like. The server 51 and the diagnostic system 52 analyze the accumulated signals of sound to detect a degradation condition of each of the monitoring target devices 50A, 50B, 50C, and 50D.

A condition of each of the monitoring target devices 50A, 50B, 50C, and 50D is notified to a manager (user) through a monitor 53 or the like. The monitor 53 may be directly connected to the server 51 or may be a monitor of a terminal used by the manager connected to the server 51 through a network. A message to notify a degradation condition is displayed on the monitor 53, for example. Note that the notification is realized not only by a display on the monitor 53 but also by an alarm from a speaker or blink of LED, for example.

Figure 14:
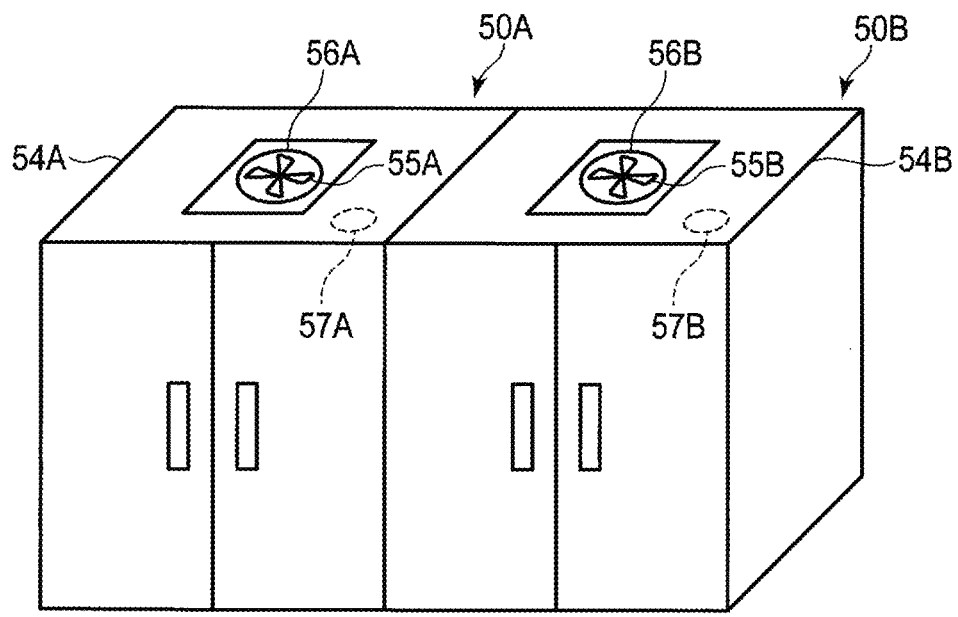
FIG. 14 is a diagram illustrating an example of an exterior of a monitoring target in the monitoring system.

FIG. 14 illustrates an example of an exterior of the monitoring target devices 50A and 50B.

As in FIG. 14, monitoring target devices 50A and 50B have the similar-shaped casings 54A and 54B, and are arranged such that the right side surface of the casing 54A of the monitoring target device 50A contacts the left side surface of the casing 54B of the monitoring target device 50B. In this example, the monitoring target devices 50A and 50B are UPS devices including fans (cooling fans) 55A and 55B. The monitoring target devices 50A and 50B perform heat discharge from openings of discharge ports 56A and 56B by circulation by the fans 55A and 55B.

Specifically, the monitoring target device 50A includes the casing 54A and the discharge port 56A is arranged on the upper surface of the casing 54A. The fan 55A is provided with the discharge port 56A to discharge air in the casing 54A to the outside.

In the monitoring target device 50A, a microphone 57A is disposed in the proximity of the fan 55A. Specifically, the microphone 57A is disposed on the casing 54A to which the fan 55A is fixed in a position opposite to the air flow direction (discharge direction) to be distant from the air flow. Note that, if it is difficult to place a microphone 57A in a position completely out of the air flow direction, the microphone 57A may be disposed at a position where an influence by the air flow can be minimized. The same applies to the monitoring target device 50B and the microphone 57B is disposed in the proximity of the fan 55B. Signals of sound picked up by the microphones 57A and 57B are sent to the server 51.

Figure 15:
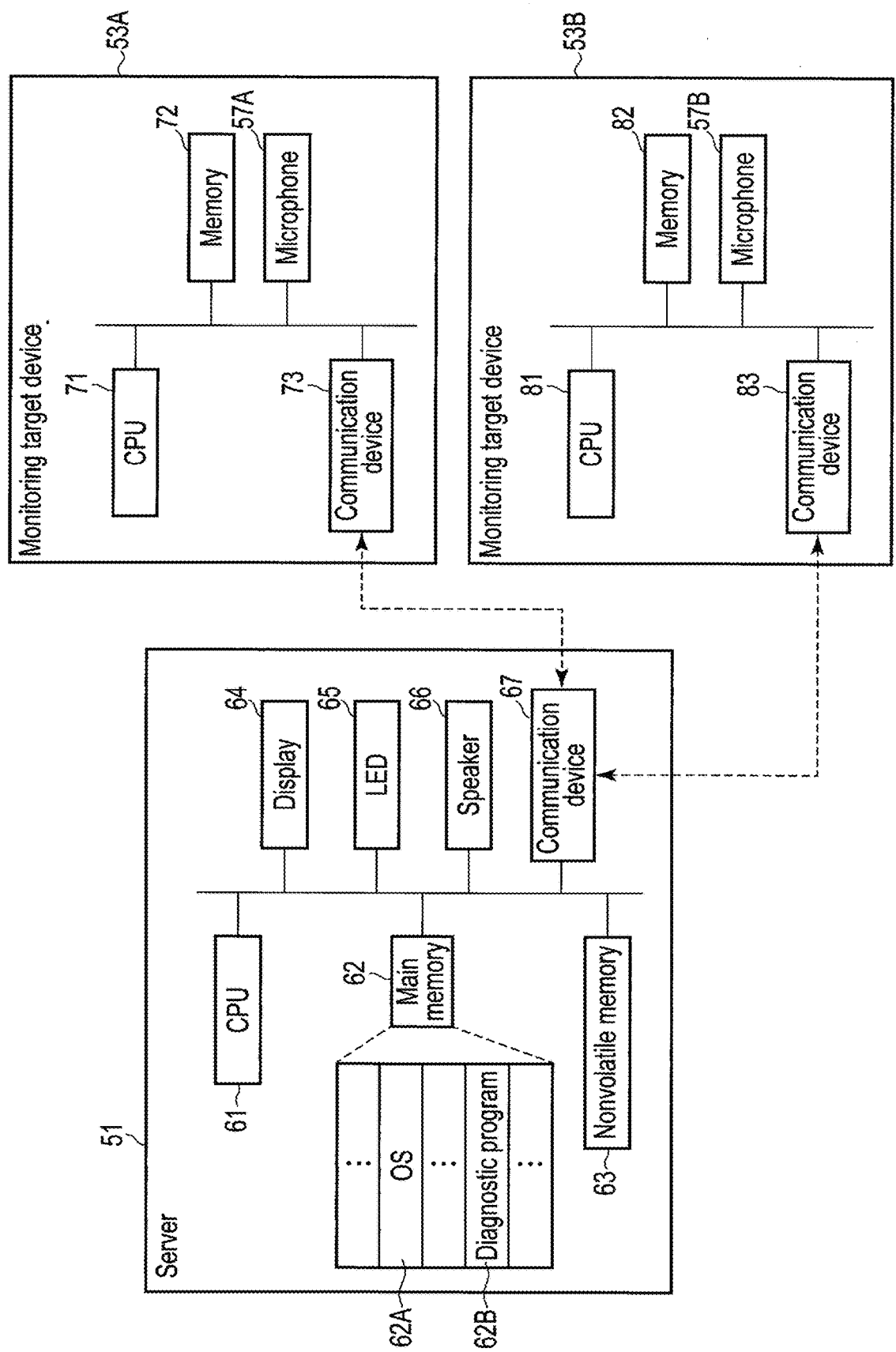
FIG. 15 is a diagram illustrating the structure of a server and a monitoring target in the monitoring system.

FIG. 15 illustrates the structure of the server 51 and the monitoring target devices 53A and 53B. In the following description, a case where the server 51 has the function of the above diagnostic system 52. The server 51 monitors conditions of the monitoring target devices 53A and 53B. The server 51 detects, for example, a degradation condition of the fan 55A of the monitoring target device 53A and a degradation condition of the fan 55B of the monitoring target device 53B.

As in FIG. 15, the monitoring target device 53A includes, for example, a CPU 71, memory 72, microphone 57A, and communication device 73.

The CPU 71 is a processor to control the operation of various components in the monitoring target device 53A. The CPU 71 obtains a signal of sound acquired from the microphone 57A. The CPU 71 transfers an identifier (ID) preliminarily applied to the microphone 57A and the obtained signal of sound to the server 51 using the communication device 73. The signal of sound is transferred to the server 51 every certain period of time. Furthermore, the obtained signal of sound may be stored in the memory 72 or the like.

The communication device 73 is a device configured to execute communication in a wired or wireless manner.

The communication device 73 includes a transmitter configured to transmit a signal and a receiver configured to receive a signal.

The monitoring target device 53B is structured similarly to the monitoring target device 53A, and includes, for example, a CPU 81, memory 82, microphone 57B, and communication device 83.

Furthermore, the server 51 includes, for example, a CPU 61, main memory 62, nonvolatile memory 63, display 64, LED 65, speaker 66, and communication device 67.

The CPU 61 is a processor configured to control operation of various components in the server 51. The CPU 61 executes various programs loaded form the nonvolatile memory 63 which is a storage device to the main memory 62. The programs include an operating system (OS) 62A and various application programs. The application programs include a diagnostic program 62B.

The diagnostic program 62B is a program to realize the diagnostic apparatus 20, and has a degradation detection function using a feature vector transformation function optimized by a first condition signal (normal condition signal) and a second condition signal (degradation condition signal). The CPU 61 executes the diagnostic program 62B to achieve the degradation detection function.

The communication device 67 is a device configured to execute communication in a wired or wireless manner. The communication device 67 includes a transmitter configured to transmit a signal and a receiver configured to receive a signal. The receiver of the communication device 67 receives a signal of sound picked up by the microphone 57A on the monitoring target device 53A and a signal of sound picked up by the microphone 57B on the monitoring target device 53B.

The display 64 displays a screen image based on a display signal generated by the CPU 61. The LED 65 turns on based on a signal generated by the CPU 61. The speaker outputs a voice based on a voice data generated by the CPU 61. The server 51 can monitor a degradation condition of the monitoring target devices 53A and 53B using at least one of the display 64, LED 65, and speaker 66.

In such a structure, the CPU 61 of the server 51 receives a signal of sound from each of the monitoring target devices 53A and 53B and executes the diagnostic process as in the flowchart of FIG. 12. In the diagnostic process, a feature vector transformation function optimized preliminarily with a first condition signal (normal condition signal) and a second condition signal (degradation condition signal), a slight change from the normal condition can be suitable responded, and a degradation condition at that time can be digitized to be notified to a manager. Thus, if, for example, a degradation degree of the monitoring target device 53A is high, replacement of the fan 55A can be performed early before possible malfunction.

Note that an input signal is not limited to a sound signal but may be a one-dimensional sensor signal such as an acceleration degree signal or a two-dimensional sensor signal such as an image or a video. Furthermore, a signal of electrocardiogram targeted for a human, or a light intensity measured in astronomical observation may be an input signal. That is, a signal indicative of any conditional change can be an input signal, and a current condition of a target can be detected with high accuracy from a change of the signals.

According to at least one of the above-described embodiments, a learning apparatus, diagnostic apparatus, and learning method to detect a degradation condition of a machine in an early stage can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning apparatus, comprising:
a memory; and
a hardware processor, connected to the memory, which learns a transformation function of a variational autoencoder (VAE) to extract a feature value of an input signal, wherein the hardware processor is configured to update the transformation function of the VAE based on
a signal indicative of a first condition and a signal indicative of a second condition, which is different from the first condition,
wherein the hardware processor is further configured to update the transformation function of the VAE by using a first loss function on the signal indicative of the first condition and a second loss function on the signal indicative of the second condition, and the second loss function is designed such that a second latent variable with respect to the signal indicative of the second condition becomes distant from center 0.

2. The learning apparatus of claim 1, wherein the hardware processor is further configured to
extract a first latent variable from the signal indicative of the first condition and extract the second latent variable from the signal indicative of the second condition using the transformation function of the VAE, and
when the first condition is a normal condition, update the transformation function of the VAE to render the first latent variable with respect to the signal indicative of the first condition closer to center 0, and update the transformation function of the VAE to render the second latent variable with respect to the signal indicative of the second condition distant from center 0.

3. The learning apparatus of claim 2, wherein the hardware processor is further configured to
extract the first latent variable from the signal indicative of the first condition, and extract a latent variable from each of signals indicative of second to m-th (m is an integer which is three or more) conditions, and
when the first condition is a normal condition, update the transformation function of the VAE to render the first latent variable with respect to the signal indicative of the first condition, and update the transformation function of the VAE to render the latent variable with respect to each of the signals indicative of the second to m-th conditions.

4. The learning apparatus of claim 3, wherein a same loss function designed to be distant from center 0 is used for the latent variable with respect to each of the signals indicative of the second to m-th conditions.

5. The learning apparatus of claim 3, wherein a different loss function designed to be distant from center 0 is used for the latent variable with respect to each of the signals indicative of the second to m-th conditions.

6. The learning apparatus of claim 1, wherein the transformation function includes a neural network.

7. The learning apparatus of claim 1, wherein the signals include a sound signal indicative of a change of condition of a device.

8. An diagnostic apparatus, comprising:
a memory; and
a hardware processor, connected to the memory, which diagnoses a condition of a device based on an input signal, wherein the hardware processor is configured to
receive a signal to be a diagnostic target and extract a feature value of the signal using a certain transformation function of a variational autoencoder (VAE), and
digitize the condition of the device based on the feature value,
wherein the transformation function of the VAE is preliminarily updated such that a latent variable with respect to a signal indicative of a second condition, which is different from a first condition, is distant from center 0.

9. The diagnostic apparatus of claim 8, wherein the hardware processor is further configured to
determine the condition of the device based on a value digitizing the condition of the device, and
perform notification corresponding to a result of the determination.

10. The diagnostic apparatus of claim 9, wherein the hardware processor includes a plurality of transformation functions preliminarily learnt per degradation mode of different degradation modes, and is further configured to perform the notification in a distinguishing fashion, the condition of the device being determined for each different degradation mode using the respective transformation function.

11. The diagnostic apparatus of claim 8, wherein the transformation function includes a neural network.

12. The diagnostic apparatus of claim 8, wherein the signal to be the diagnostic target includes a sound signal indicative of a change in the condition of the device.

13. A learning method, executed by a computer, to learn a transformation function of a variational autoencoder (VAE) to extract a feature value of an input signal, comprising:
updating the transformation function of the VAE based on a signal indicative of a first condition and a signal indicative of a second condition, which is different from the first condition, wherein
the updating of the transformation function of the VAE is performed by using a first loss function on the signal indicative of the first condition and a second loss function on the signal indicative of the second condition, and
the second loss function is designed such that a second latent variable with respect to a signal indicative of the second condition becomes distant from center 0.

14. The learning method of claim 13, further comprising:
extracting a first latent variable from the signal indicative of the first condition, and extracting the second latent variable from the signal indicative of the second condition using the transformation function of the VAE, and
when the first condition is a normal condition, updating the transformation function of the VAE to render the first latent variable with respect to the signal indicative of the first condition closer to center 0, and updating the transformation function of the VAE to render the second latent variable with respect to the signal indicative of the second condition distant from center 0.

\* \* \* \* \*